United States Patent
Thomas et al.

(10) Patent No.: US 10,425,384 B1
(45) Date of Patent: *Sep. 24, 2019

(54) OPTIMIZING CONNECTIONS OVER VIRTUAL PRIVATE NETWORKS

(71) Applicant: OPEN INVENTION NETWORK LLC, Durham, NC (US)

(72) Inventors: Geoffrey G. Thomas, San Francisco, CA (US); John Whaley, Fremont, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,376

(22) Filed: Apr. 10, 2018

Related U.S. Application Data

(63) Continuation of application No. 14/145,586, filed on Dec. 31, 2013, now Pat. No. 9,942,199.

(51) Int. Cl.
*H04L 29/06* (2006.01)
*H04L 12/46* (2006.01)

(52) U.S. Cl.
CPC ...... *H04L 63/0272* (2013.01); *H04L 12/4641* (2013.01)

(58) Field of Classification Search
CPC .................. H04L 63/0272; H04L 12/4641
See application file for complete search history.

(56) References Cited

U.S. PATENT DOCUMENTS

| | | | | |
|---|---|---|---|---|
| 5,835,726 A * | 11/1998 | Shwed | .................. | H04L 9/3247 709/229 |
| 7,937,438 B1 * | 5/2011 | Miller | ..................... | H04L 41/12 709/203 |
| 8,776,209 B1 * | 7/2014 | Kumar | ................ | H04L 63/0272 380/270 |
| 2003/0041091 A1 * | 2/2003 | Cheline | ............. | H04L 29/12066 709/200 |
| 2003/0056063 A1 * | 3/2003 | Hochmuth | .......... | H04L 63/0272 711/152 |
| 2005/0120082 A1 * | 6/2005 | Hesselink | ........... | H04L 63/0272 709/203 |
| 2006/0031407 A1 * | 2/2006 | Dispensa | .......... | H04L 29/12009 709/219 |
| 2006/0037072 A1 * | 2/2006 | Rao | ....................... | H04L 1/1854 726/14 |
| 2006/0074618 A1 * | 4/2006 | Miller | ................. | G06F 9/45504 703/13 |
| 2007/0248085 A1 * | 10/2007 | Volpano | ............. | H04L 12/4679 370/389 |

(Continued)

*Primary Examiner* — John B King

(57) ABSTRACT

The disclosed embodiments provide a system that provides a virtual private network (VPN). The system includes a routing apparatus on a public network. The routing apparatus accepts a first connection with a client on the VPN and a second connection with a gateway in a private network extended by the VPN. Next, the routing apparatus receives a first set of packets from the client over the first connection, wherein the first set of packets is encrypted. The routing apparatus then routes the first set of packets to the gateway. The system also includes the gateway, which establishes the second connection with the routing apparatus. Next, the gateway decrypts the first set of packets and routes the decrypted first set of packets to a host in the private network.

20 Claims, 5 Drawing Sheets

(56) References Cited

U.S. PATENT DOCUMENTS

| | | | | |
|---|---|---|---|---|
| 2007/0271606 A1* | 11/2007 | Amann | ............... | H04W 12/02 |
| | | | | 726/15 |
| 2007/0298848 A1* | 12/2007 | Babin | ............... | H04L 29/12471 |
| | | | | 455/574 |
| 2009/0138938 A1* | 5/2009 | Harrison | ............... | G06F 21/604 |
| | | | | 726/1 |
| 2011/0013637 A1* | 1/2011 | Xue | ............... | H04L 12/4679 |
| | | | | 370/395.5 |
| 2011/0022711 A1* | 1/2011 | Cohn | ............... | G06F 9/5061 |
| | | | | 709/225 |
| 2013/0254847 A1* | 9/2013 | Adams | ............... | G06F 21/6218 |
| | | | | 726/4 |

\* cited by examiner

OPTIMIZING CONNECTIONS OVER VIRTUAL PRIVATE NETWORKS

RELATED APPLICATION

This application is a continuation of U.S. patent application Ser. No. 14/145,586, filed Dec. 31, 2013, entitled "OPTIMIZING CONNECTIONS OVER VIRTUAL PRIVATE NETWORKS," issued as U.S. Pat. No. 9,942,199 on Apr. 10, 2018, the contents of which is incorporated by reference herein.

BACKGROUND

Field

The disclosed embodiments relate to virtual private networks (VPNs). More specifically, the disclosed embodiments relate to techniques for optimizing connections over VPNs.

Related Art

Private networks and/or intranets may be used to share an organization's information and/or operational systems with members of the organization. For example, a company's intranet may allow employees of the company to access calendars, documents, files, utilities, applications, and/or other sensitive data and computing resources.

Private networks may also be securely extended across public networks such as the Internet using virtual private networks (VPNs). For example, an organization's VPN may allow a member of the organization to access the organization's intranet while traveling and/or working outside of the organization's physical boundaries. The VPN may also be used to connect multiple geographically disparate locations of the organization, such as a head office and one or more regional offices.

To protect an organization's sensitive data and resources, the organization's private network may include a number of security measures, such as firewalls and user authentication. Similarly, a VPN may secure data transmitted between the private network and a device on a public network by authenticating the user of the device, using a tunneling protocol to transmit data over the VPN, and/or encrypting the data before the data is transmitted.

However, the setup and use of VPNs may be associated with significant overhead. First, a VPN may require the setup of a server and/or VPN concentrator in the demilitarized zone (DMZ) of a private network, as well as the configuration of the private network's firewall to handle VPN traffic. VPN software may also be installed on an endpoint (e.g., server) in the private network to allow the endpoint to handle VPN traffic. Second, encryption and decryption of data transmitted in the VPN may protect the data but may also increase network latency within the VPN.

Consequently, use of VPNs may be facilitated by mechanisms for simplifying the setup of the VPNs and/or improving data transmission within the VPNs.

SUMMARY

The disclosed embodiments provide a system that provides a virtual private network (VPN). The system includes a routing apparatus on a public network. The routing apparatus accepts a first connection with a client on the VPN and a second connection with a gateway in a private network extended by the VPN. Next, the routing apparatus receives a first set of packets from the client over the first connection, wherein the first set of packets is encrypted. The routing apparatus then routes the first set of packets to the gateway. The system also includes the gateway, which establishes the second connection with the routing apparatus. Next, the gateway decrypts the first set of packets and routes the decrypted first set of packets to a host in the private network.

In some embodiments, the system also includes the client. The client establishes the first connection with the routing apparatus. Next, the client encrypts the first set of packets. The client then transmits the first set of packets over the first connection to the routing apparatus.

In some embodiments, the gateway receives a second set of packets from the host and encrypts the second set of packets. Next, the gateway transmits the second set of packets over the second connection to the routing apparatus, and the routing apparatus routes the second set of packets to the client.

In some embodiments, the client receives the second set of packets over the first connection from the routing apparatus and decrypts the second set of packets.

In some embodiments, the first and second sets of packets are encrypted and decrypted using a shared secret between the client and the gateway.

In some embodiments, the gateway and the client also verify the first and second sets of packets using the shared secret, and use the verified first and second sets of packets to improve transmission of the first and second sets of packets.

In some embodiments, improving transmission of the first and second sets of packets is associated with at least one of:
  (i) omitting a three-way handshake between the client and the host;
  (ii) bypassing checksums on the first and second sets of packets;
  (iii) setting a maximum transmission unit (MTU) associated with transmission of the first and second sets of packets; and
  (iv) setting a receive window associated with transmission of the first and second sets of packets.

In some embodiments, the client also exchanges a third set of packets with another client on the VPN through the routing apparatus or a direct connection with the other client.

In some embodiments, the gateway and the client also maintain the first and second connections with the routing apparatus by periodically transmitting keep-alive packets to the routing apparatus.

In some embodiments, each packet from the first set of packets includes a destination identifier, a cryptographic header, and a payload.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
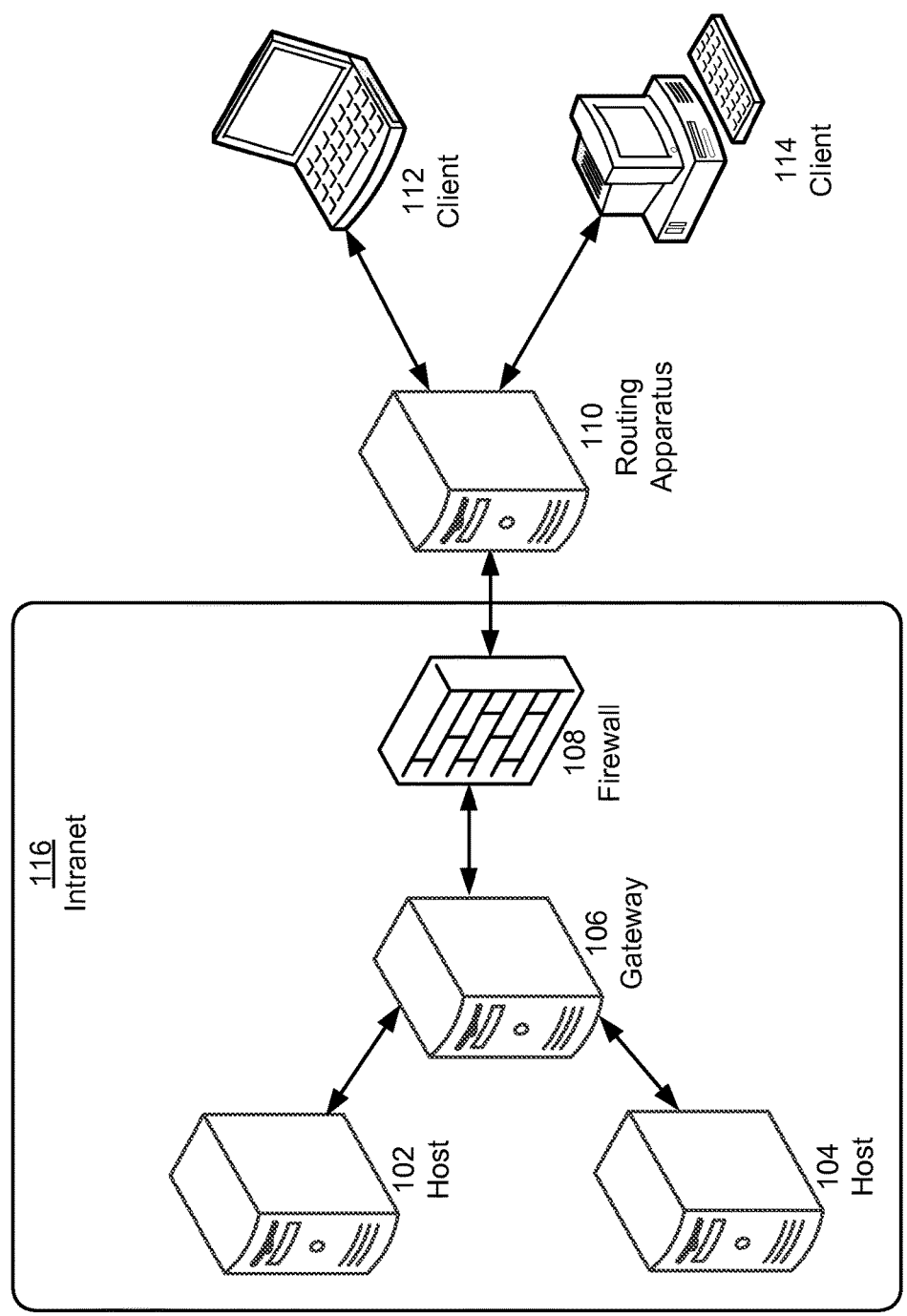
FIG. 1 shows a schematic of a system in accordance with the disclosed embodiments.

The disclosed embodiments provide a method and system for facilitating use of a virtual private network (VPN). As shown in FIG. 1, the VPN may extend an intranet 116 to one or more clients 112-114 outside of intranet 116. Clients 112-114 may be mobile phones, personal computers, laptop computers, tablet computers, workstations, and/or other network-enabled electronic devices connected to a public network such as the Internet.

On the other hand, intranet 116 may be a private computer network that is used to share data and/or services within an organization. For example, intranet 116 may include the organization's computer infrastructure, internal websites, code and data repositories, documents, classified information, and/or other components related to communication and collaboration within the organization. Services and/or data in intranet 116 may be provided by one or more hosts 102-104 (e.g., servers). For example, hosts 102-104 may provide web services using HyperText Transfer Protocol (HTTP); email services using Simple Mail Transfer Protocol (SMTP), Post Office Protocol (POP), and/or Internet Message Access Protocol (IMAP); and file transfer services using File Transfer Protocol (FTP) and/or Secure Copy (SCP).

Because intranet 116 may include sensitive data and/or services that are specific to the organization and/or members of the organization, access to intranet 116 may be limited to authorized users, such as members (e.g., employees) of the organization. For example, intranet 116 may store sensitive information related to employees, trade secrets, products, and/or research and development and allow access to organization-specific applications and computing resources associated with communication, collaboration, management, and/or business operations. To secure such information and resources against unauthorized access, intranet 16 may include security measures such as a firewall 108, software filters, and/or user authentication.

In turn, access to intranet 116 through the VPN may be secured by additional authentication, encryption, certification authorities, smart cards and/or security tokens. For example, users of clients 112-114 may use clients 112-114 to interact with hosts 102-104 within intranet 116 and obtain services and/or data provided by hosts 102-104. To access the VPN, the users may use VPN software on clients 112-114 to authenticate with the VPN and encrypt packets that are destined for hosts 102-104. Encrypted packets received from the VPN may also be decrypted by the VPN software, thus enabling the secure transmission of data between clients 112-114 and hosts 102-104.

Moreover, the VPN may include a gateway 106 in intranet 116 and a routing apparatus 110 outside intranet 116 (e.g., on one or more public networks). Gateway 106 and/or routing apparatus 110 may route packets between clients 112-114 and hosts 102-104 and enable encryption and/or verification of the packets without requiring the installation of VPN software on hosts 102-104. Such encryption and/or verification of packets transmitted in the VPN may further enable the optimization of VPN connections among clients 112-114 and hosts 102-104, as described in further detail below with respect to FIG. 2.

Figure 2:
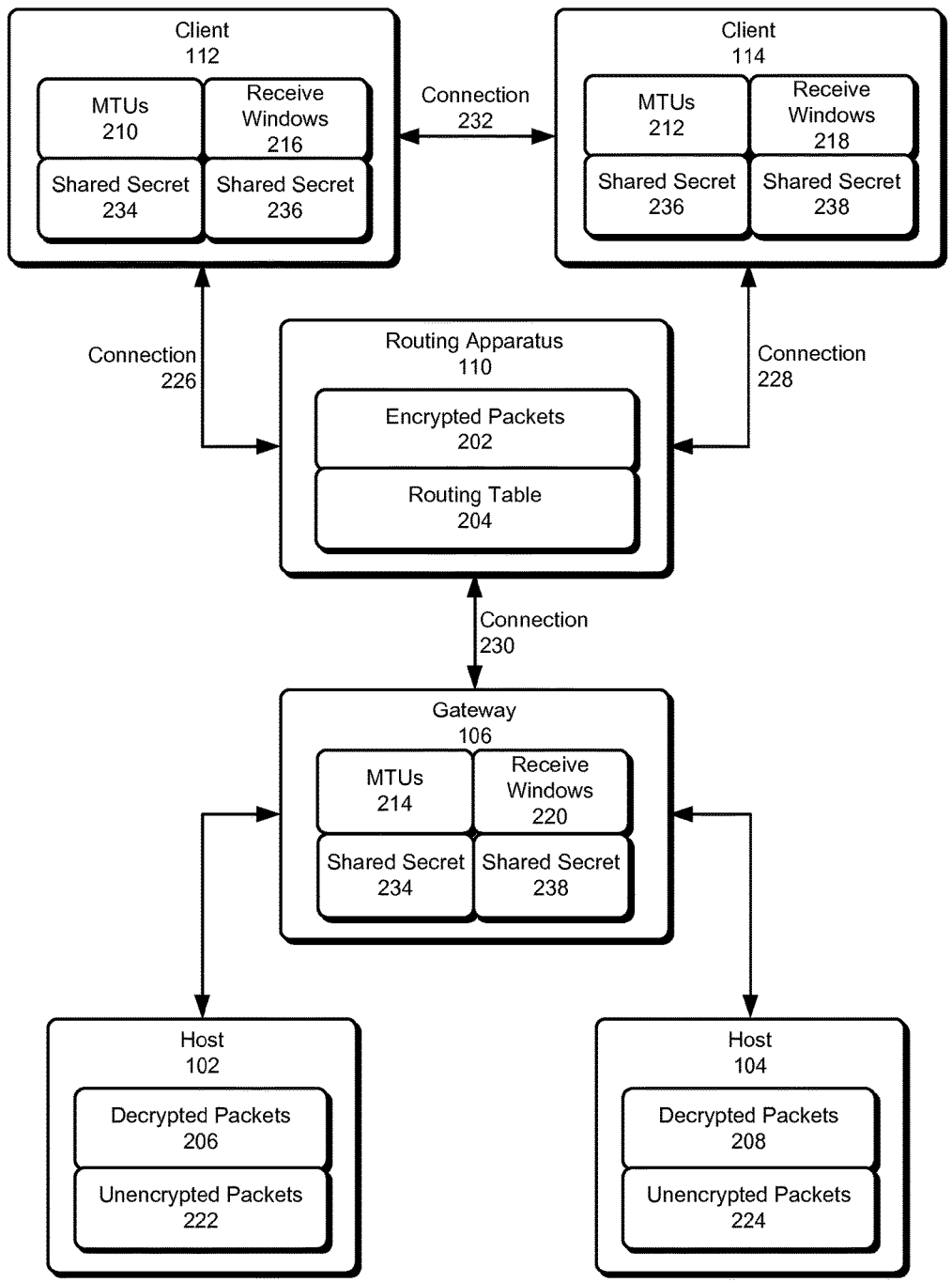
FIG. 2 shows a system for providing a virtual private network (VPN) in accordance with the disclosed embodiments.

FIG. 2 shows a system for providing a VPN in accordance with the disclosed embodiments. As mentioned above, the system may include clients 112-114, routing apparatus 110, and gateway 106. Routing apparatus 110 may reside in a public network such as the Internet, and gateway 106 may be placed behind a firewall (e.g., firewall 108 of FIG. 1) of an intranet (e.g., intranet 116 of FIG. 1) and/or private network extended by the VPN.

Routing apparatus 110 may be provided by one or more publicly accessible servers (e.g., in a cloud computing system) and route packets between clients 112-114 on the public network and gateway 106 in the intranet. Data in the packets may be encrypted and/or authenticated, thus maintaining the confidentiality and/or integrity of the packets during transmission of the packets across the public network. In other words, encryption and/or authentication of the packets may prevent snooping on and/or tampering with the packets by routing apparatus 110 and/or an attacker on the public network.

To enable routing of packets between clients 112-114 and gateway 106, routing apparatus 110 may accept connections 226-230 from clients 112-114 and gateway 106, respectively. Because gateway 106 is behind the private network's firewall, gateway 106 may be unable to accept incoming connections from outside the firewall. Instead, gateway 106 may establish an outgoing connection 230 with routing apparatus 110 by sending one or more packets to routing apparatus 110 and receiving a response from routing apparatus 110. Similarly, clients 112-114 may establish connections 226-228 over the public network with routing apparatus 110 by sending packets to routing apparatus 110 and receiving responses from routing apparatus 110.

After connections 226-230 are established, clients 112-114 and gateway 106 may maintain connections 226-230 by periodically transmitting keep-alive packets to routing apparatus 110. For example, clients 112-114 and gateway 106 may establish connections 226-230 and/or join the VPN by transmitting User Datagram Protocol (UDP) packets to routing apparatus 110. Clients 112-114 and gateway 106 may then transmit keep-alive packets over UDP to routing apparatus 110 to maintain UDP port mapping and/or state with routing apparatus 110. Gateway 106 and/or clients 112-114 may also use UDP packets and routing apparatus 110 to perform Network Address Translator (NAT) traversal, if gateway 106 and/or clients 112-114 are located behind NATs.

In one or more embodiments, packets transmitted across the VPN are encrypted, authenticated, and verified using a shared secret (e.g., shared secrets 234-238) between two nodes connected to routing apparatus 110 (e.g., clients 112-114, gateway 106). For example, each node may generate a public/private key pair, such as a Curve25519 key pair and/or a key pair generated using another shared-secret protocol. To join the VPN, the node may provide the public key from the key pair to routing apparatus 110, and routing apparatus 110 may assign a VPN Internet Protocol (IP) address to the node. Routing apparatus 110 may also maintain a list and/or routing table 204 containing the public key, VPN IP address, external IP address, and port number of each node and send the list to all nodes connected to routing apparatus 110. Each node may then compute a shared secret with every other node using the node's private key and the other node's public key.

As a result, shared secret 234 between client 112 and gateway 106 may be computed by gateway 106 using the public key of client 112 and the private key of gateway 106 and by client 112 using the public key of gateway 106 and the private key of client 112. Similarly, shared secret 238 between client 114 and gateway 106 may be computed by gateway 106 using the public key of client 114 and the private key of gateway 106 and by client 114 using the public key of gateway 106 and the private key of client 114. Finally, shared secret 236 between clients 112-114 may be computed by client 112 using the public key of client 114 and the private key of client 112 and by client 114 using the public key of client 112 and the private key of client 114.

Once a shared secret is established between two nodes, the shared secret may be used to encrypt, authenticate, decrypt, and verify packets transmitted between the nodes. For example, an Advanced Encryption Standard (AES) key may be computed as a hash-based Message Authentication Code (HMAC) of a pre-specified string using the shared secret as the HMAC key. The AES key may then be used in AES-Galois Counter Mode (GCM) authenticated encryption of packets transmitted between the nodes. Alternatively, other authenticated encryption mechanisms, such as AES+HMAC, may be used to authenticate, encrypt, decrypt, and verify the packets.

More specifically, gateway 106 may establish connection 230 with routing apparatus 110 by providing a public key and a range of IP addresses (e.g., IP addresses of hosts 102-104) for which gateway 106 is responsible. A client (e.g., clients 112-114) on the public network may communicate with a host (e.g., hosts 102-104) in the intranet by establishing a separate connection (e.g., connections 226-228) with routing apparatus 110, then encrypting and authenticating the payloads of a set of packets destined for the host using a shared secret with gateway 106. The client may also add a destination identifier (e.g., IP address) identifying the destination host and a cryptographic header (e.g., initialization vector (IV), nonce, salt, etc.) to each encrypted payload and transmit the set of encrypted packets 202 to routing apparatus 110. Routing apparatus 110 may use the destination identifiers in encrypted packets 202 and routing table 204 to route encrypted packets 202 to gateway 106, and gateway 106 may decrypt and verify encrypted packets 202 using the shared secret and cryptographic header. Finally, gateway 106 may route the decrypted packets (e.g., decrypted packets 206-208) to the host for which the packets are destined.

Because gateway 106 is configured to process and route VPN traffic, installation of VPN software on hosts 102-104 may be omitted, thereby mitigating complexity associated with setup of the VPN. As a result, packets from a host (e.g., hosts 102-104) to a client (e.g., clients 112-114) outside the intranet may be received unencrypted (e.g., unencrypted packets 222-224) by gateway 106. Prior to transmitting the packets to routing apparatus 110, gateway 106 may encrypt and authenticate the packets using the shared secret with the client and add a destination identifier (e.g., IP address) for the client and a cryptographic header to each packet. After receiving a set of encrypted packets 202 from gateway 106, routing apparatus 110 may use routing table 204 and the destination identifier from each packet to route the packet to the client. The client may then use the shared secret and cryptographic header to decrypt and verify encrypted packets 202 before using the decrypted data from the packets.

Routing apparatus 110 may also route packets between clients (e.g., clients 112-114) on the VPN. The packets may be encrypted, authenticated, decrypted, and verified using a shared secret (e.g., shared secret 236) between the clients. The packets may additionally be transmitted using a direct connection (e.g., connection 232) between the clients if routing apparatus 110 and/or the clients discover that both clients are on the same network. Such direct transmission of packets between the clients may reduce use of routing apparatus 110 and network latency experienced by the clients.

In one or more embodiments, encryption and authentication of packets transmitted across the VPN are used by clients 112-114 and gateway 106 to optimize connections (e.g., connections 226-232) over the VPN. In particular, authentication and/or encryption of packets among clients 112-114 and gateway 106 may allow clients 112-114 and gateway 106 to verify the identities of the nodes from which the packets are received.

As a result, clients 112-114 and gateway 106 may omit three-way handshakes (e.g., a Transmission Control Protocol (TCP) handshake) for establishing point-to-point connections in the VPN. For example, clients 112-114 may transmit packets containing encrypted data to routing apparatus 110 without first performing a TCP handshake with one another and/or hosts 102-104. To omit the TCP handshake, a driver in each client may intercept packets related to the TCP handshake before the packets are transmitted to routing apparatus 110. Generation of TCP packets for a TCP handshake may be omitted altogether on the client if the client implements TCP chimney offload. On the other hand, gateway 106 may perform a TCP handshake with hosts 102-104, which communicate using conventional TCP mechanisms, instead of transmitting packets associated with the TCP handshake outside the intranet (e.g., to routing apparatus 110). In turn, gateway 106 may reduce the amount of time required to establish TCP connections involving hosts 102-104.

Similarly, clients 112-114 and gateway 106 may bypass checksums on packets transmitted within the VPN. Instead, clients 112-114 and gateway 106 may use HMACs, signatures, and/or other verification mechanisms associated with the packets to verify the integrity of data in the packets.

Finally, clients 112-114 and gateway 106 may use previous connection information to set one or more receive windows 216-220 and/or maximum transmission units (MTUs) 210-214 associated with transmission of packets in the VPN. Each receive window may represent the amount of data that a node is willing to receive over a connection with another node without acknowledging the sending node, and each MTU may represent the largest packet that can be transmitted without fragmentation.

A node connected to routing apparatus 110 may initially negotiate a receive window and/or MTU with another node during a first connection with the other node and store the receive window and/or MTU for use in subsequent connections with the other node. For example, a driver in a client may store the receive window and/or MTU of a connection with another node and set the receive window and/or MTU to the stored values in subsequent connections with the other node. As a result, a different receive window and/or MTU may be stored for each pair of endpoints in the VPN. Conversely, a stored receive window and/or MTU may be used in subsequent connections with similar characteristics. For example, a receive window and/or MTU established between a client and gateway 106 may be used for subsequent connections between the client and the intranet, even if the client connects to a different gateway in the intranet.

Such optimizations may provide performance enhancements to network traffic within the VPN. Moreover, the use of gateway 106 inside the intranet and routing apparatus 110 on the public network may simplify setup of the VPN. For example, gateway 106 and routing apparatus 110 may enable secure communication between clients 112-114 and hosts 102-104 without requiring the setup of components on a demilitarized zone (DMZ) between the intranet and public network, changes to the intranet's firewall, and/or the installation of VPN software on hosts 102-104. Instead, the VPN may be created by setting up gateway 106 in the intranet, installing routing apparatus 110 on the public network, and configuring gateway 106 and clients 112-114 to make an outgoing connection 230 with routing apparatus 110.

Those skilled in the art will appreciate that the system of FIG. 2 may be implemented in a variety of ways. As discussed above, routing apparatus 110 may be provided by one or more servers that route packets among clients 112-114 and gateway 106. As a result, routing apparatus 110 may introduce one or more hops in the paths through which the packets are passed. Similarly, multiple gateways may be used to route network traffic to and from multiple hosts (e.g., hosts 102-104) in the intranet. In other words, routing apparatus 110 and gateway 106 may be scaled to handle communications from varying numbers of clients on the public network and hosts within the intranet. Finally, VPN functionality may be implemented on clients 112-114 by a driver, dedicated VPN software, and/or another hardware and/or software component.

Figure 3:
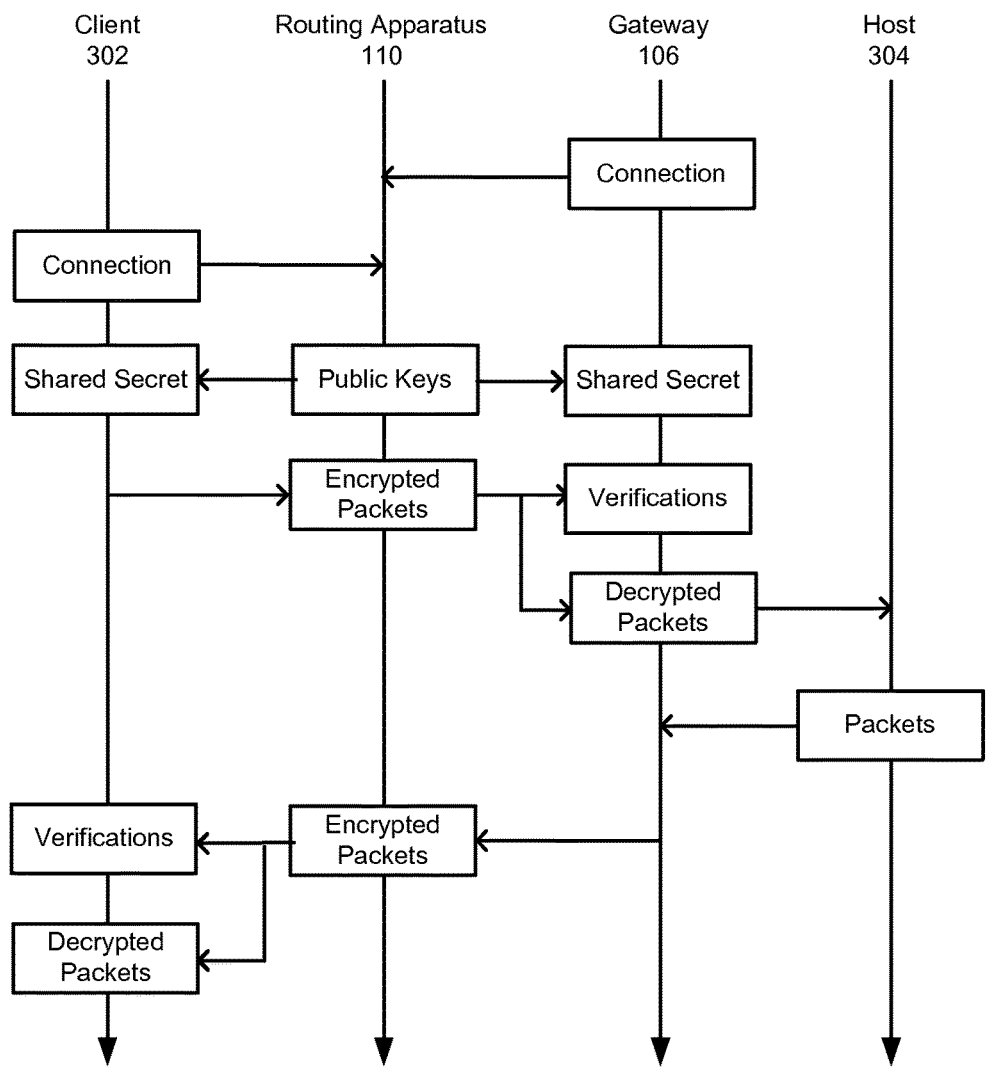
FIG. 3 shows the exemplary transmission of packets among components in a VPN in accordance with the disclosed embodiments.

FIG. 3 shows the exemplary transmission of packets among components in a VPN in accordance with the disclosed embodiments. First, the VPN may be enabled by the establishment of a connection between gateway 106 and routing apparatus 110. For example, gateway 106 may "register" with routing apparatus 110 by transmitting one or more UDP packets containing the public key of gateway 106 to routing apparatus 110 and a range of IP addresses associated with hosts (e.g., host 304) for which gateway 106 is responsible. Routing apparatus 110 may respond with a VPN IP address assigned to gateway 106, and gateway 106 may maintain the connection by periodically transmitting a keep-alive packet to routing apparatus 110.

Next, a client 302 on the public network may establish a separate connection with routing apparatus 110. As with gateway 106, client 302 may transmit one or more UDP packets containing the public key of client 302 to routing apparatus 110, and routing apparatus 110 may respond with a VPN IP address assigned to client 302. Client 302 may also periodically transmit a keep-alive packet to routing apparatus 110 to maintain the UDP state and/or mapping associated with the connection.

Client 302 and gateway 106 may then establish a shared secret using the public keys provided to routing apparatus 110. For example, routing apparatus 110 may provide a list of public keys, IP addresses, ports, and/or other information of all nodes connected to routing apparatus 110 (e.g., client 302, gateway 106) to the nodes. Client 302 may obtain the shared secret using the public key of gateway 106 from the list and the private key of client 302. Gateway 106 may obtain the shared secret using the public key of client 302 from the list and the private key of gateway 106.

After establishing the shared secret with gateway 106, client 302 may communicate with host 304 in the intranet by using the shared secret to encrypt and authenticate a first set of packets destined for host 304, then transmitting the first set of packets to routing apparatus 110. Routing apparatus 110 may use the destination IP address and/or another destination identifier in the packets to route the packets to gateway 106, and gateway 106 may perform verifications of the packets before decrypting the packets and forwarding the packets to host 304.

Host 304 may respond to the communications from client 302 by transmitting a second set of packets to gateway 106. Because host 304 may not be configured to process VPN traffic, the second set of packets may be received unencrypted by gateway 106. Gateway 106 may use the shared secret to encrypt and authenticate the second set of packets and transmit the encrypted packets to routing apparatus 110. Routing apparatus 110 may then forward the packets to client 302, and client 302 may use the shared secret to perform verifications of the packets and decrypt the packets.

Figure 4:
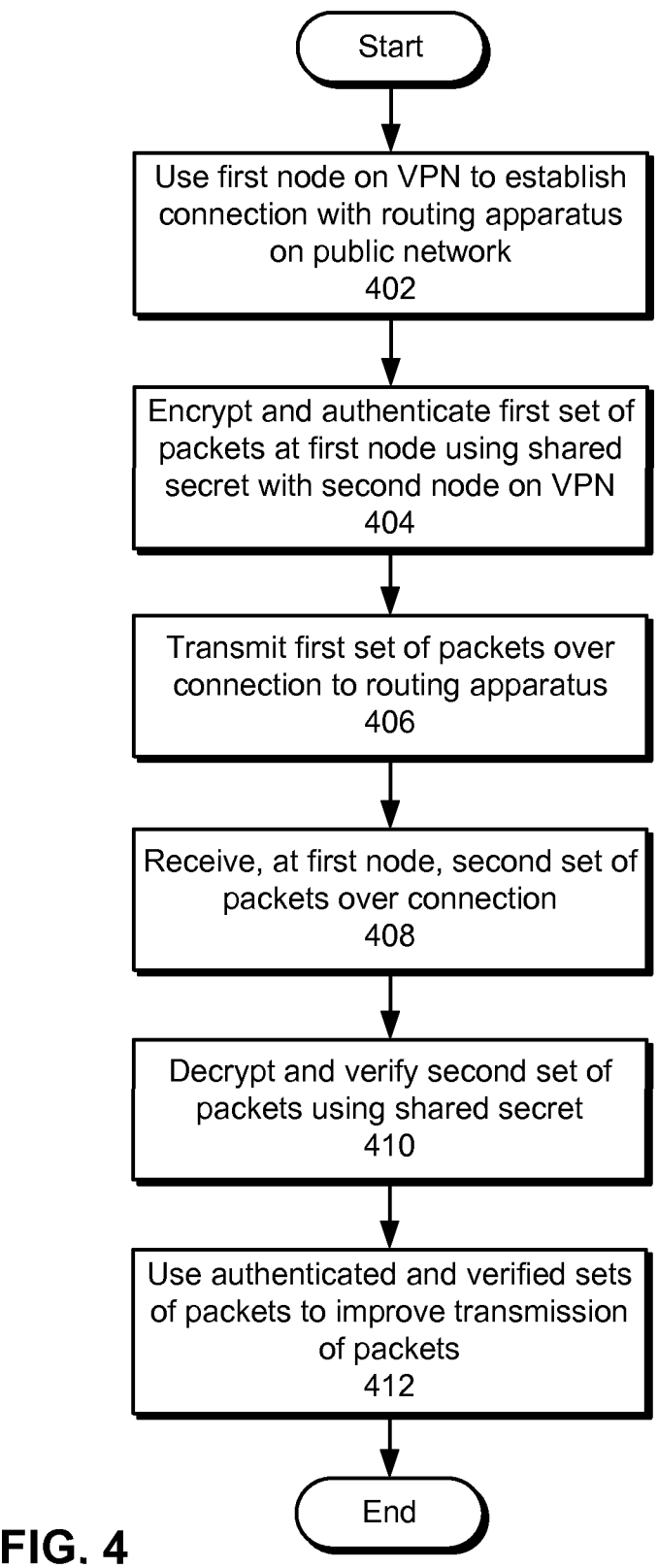
FIG. 4 shows a flowchart illustrating the process of facilitating use of a VPN in accordance with the disclosed embodiments.

FIG. 4 shows a flowchart illustrating the process of facilitating use of a VPN in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a first node on a VPN is used to establish a connection with a routing apparatus on a public network (operation 402). The first node may be a client on the public network and/or a gateway inside a private network extended by the VPN. Next, a first set of packets is encrypted and authenticated at the first node using a shared secret with a second node on the VPN (operation 404). To establish the shared secret, the first and second nodes may exchange public keys (e.g., using Diffie-Hellman key exchange) through the routing apparatus. Each node may then obtain the shared secret using the node's private key and the public key of the other node.

The first set of packets is then transmitted over the connection to the routing apparatus (operation 406). Prior to transmitting the first set of packets, the first node may add a destination identifier (e.g., IP address) for the destination of the packets and a cryptographic header (e.g., IV, nonce, salt, etc.) used in encrypting the packets to each of the packets. After the routing apparatus receives the first set of packets, the routing apparatus may route the first set of packets to the second node. Because the packets are encrypted and authenticated, the routing apparatus and/or another component of the public network (e.g., an attacker) may be unable to snoop on and/or tamper with the packets.

A second set of packets may also be received at the first node over the connection (operation 408). For example, the second set of packets may be received as a response to the first set of packets. The second set of packets may be generated by a host inside the private network and transmitted from the host to the gateway, and the gateway may encrypt and authenticate the second set of packets before transmitting the packets to the routing apparatus for forwarding to the first node. Alternatively, the response may be received from a second node on the same network (e.g., local area network (LAN)) as the first node. As a result, the response may initially be routed through the routing apparatus; after the first and/or second nodes discover the presence of the other node on the same network, the two nodes may use a direct connection with one another to send and receive packets over the VPN with one another. The direct connection may reduce both use of the routing apparatus and network latency experienced by the nodes during transmission of packets between the nodes.

After the second set of packets is received, the second set of packets is decrypted and verified using the shared secret (operation 410) by the first node. The authenticated and verified sets of packets may then be used to improve transmission of the packets (operation 412) over the VPN. More specifically, the first and second nodes may use authentication and verification of the packets to establish the identity of the other node and a connection over the VPN with the other node.

In turn, the established identities and connection may allow the nodes to omit a three-way handshake (e.g., TCP handshake) associated with the first and second sets of packets. For example, the first and/or second nodes may omit the transmission of one or more packets associated with the three-way handshake. Alternatively, the first and/or second nodes may perform the three-way handshake with an endpoint associated with the three-way handshake (e.g., a host in the private network) in lieu of transmitting the packet(s) to the other node, which may act as the other endpoint of the connection. The first and/or second nodes may also use authentication and verification of the packets to bypass checksums on the packets. Finally, the first and/or second nodes may use information from previous connections over the VPN to set a receive window and/or MTU associated with transmission of the packets. Consequently, the first and/or second nodes may optimize the transmission of packets over the VPN connection with one another.

Figure 5:
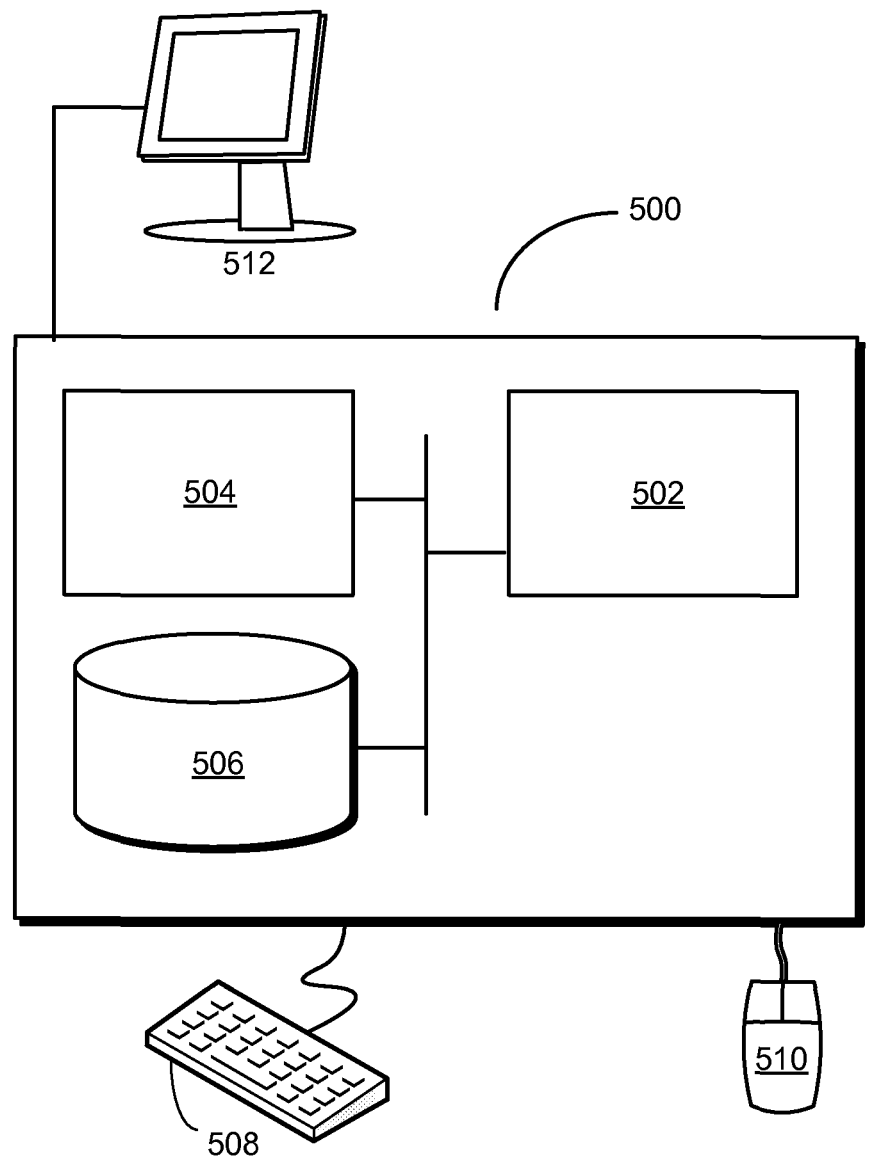
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for providing a VPN. The system may include a routing apparatus on a public network. The routing apparatus may accept a first connection with a client on the VPN and a second connection with a gateway in a private network extended by the VPN. Next, the routing apparatus may receive a first set of packets, which are encrypted, from the client over the first connection. The routing apparatus may then route the first set of packets to the gateway.

Alternatively, computer system 500 may implement the gateway. The gateway may establish the second connection with the routing apparatus and decrypt the first set of packets received from the routing apparatus. The gateway may also route the decrypted first set of packets to a host in the private network.

Finally, computer system 500 may provide the client. The client may establish the first connection with the routing apparatus, encrypt the first set of packets, and transmit the first set of packets over the first connection to the routing apparatus.

The gateway may also receive a second set of packets from the host and encrypt the second set of packets. The gateway may then transmit the second set of packets over the second connection to the routing apparatus, and the routing apparatus may route the second set of packets to the client. The client may receive the second set of packets over the first connection from the routing apparatus and decrypt the second set of packets.

The gateway and client may additionally use a shared secret to encrypt, decrypt, and verify the first and second sets of packets. The gateway and client may also use the verified first and second sets of packets to improve transmission of the first and second sets of packets. For example, the gateway and client may omit a three-way handshake between the client and the host and/or bypass checksums on the first and second sets of packets. The gateway and client may also set a maximum transmission unit (MTU) and/or receive window associated with transmission of the first and second sets of packets.

In addition, one or more components of computer system 500 may be remotely located and connected to the other components over a network. Portions of the present embodiments (e.g., gateway, routing apparatus, client, etc.) may also be located on different nodes of a distributed system that implements the embodiments. For example, the present embodiments may be implemented using a cloud computing system and/or one or more trusted components that provide a VPN to a set of remote clients.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system, comprising:
a routing apparatus on a public network, the routing apparatus configured to accept a first connection with a client on a virtual private network (VPN), and a second connection with a VPN gateway behind a firewall in a private network extended by the VPN; and
the VPN gateway configured to establish the second connection with the routing apparatus, receive a set of packets from a host device of the private network, encrypt the set of packets using a shared secret that is unknown to the routing apparatus and shared between the client on the public network and the VPN gateway that is behind the firewall of the private network, insert a destination identifier of the client on the public network, and route the encrypted set of packets having the destination identifier of the client to the routing apparatus via the second connection;
wherein secure access to private resources of the host device behind the firewall of the private network is extended from behind the firewall to the client on the public network;
wherein the VPN is extended to the client by the routing apparatus via the public network without requiring the client to install VPN software.

2. The system of claim 1, further comprising the VPN gateway configured to encrypt the set of packets via a shared secret between the client on the public network and the VPN gateway behind the firewall on the private network.

3. The system of claim 1, further comprising the client configured to establish the first connection with the routing apparatus, encrypt another set of packets, and transmit the other set of packets over the first connection to the routing apparatus.

4. The system of claim 1, wherein the routing apparatus is further configured to route the set of packets from the VPN gateway to the client based on the destination identifier added by the VPN gateway.

5. The system of claim 4, wherein the client is further configured to receive the set of packets over the first connection from the routing apparatus and decrypt the set of packets.

6. The system of claim 2, wherein the client is further configured to exchange a further set of packets with another client on the VPN through the routing apparatus or a direct connection with the other client.

7. The system of claim 2, wherein the VPN gateway and the client are further configured to maintain the first and second connections with the routing apparatus via a periodic transmission of keep-alive packets to the routing apparatus.

8. The system of claim 1, wherein each packet from the set of packets comprises a destination identifier added by the VPN gateway, a cryptographic header added by the VPN gateway, and a payload.

9. A computer-implemented method, comprising:
establishing a connection between a routing apparatus on a public network and a virtual private network (VPN) gateway behind a firewall in a private network extended by the VPN;
receiving, by the VPN gateway, a set of packets from a host device of the private network, encrypting, by the VPN gateway, the set of packets using a shared secret that is unknown to the routing apparatus and shared between a client on the public network and the VPN gateway that is behind the firewall of the private network, and inserting, by the VPN gateway, a destination identifier of the client on the public network; and
transmitting, by the VPN gateway, the set of packets having the destination identifier of the client to the routing apparatus;
wherein secure access to private resources of the host device behind the firewall of the private network is extended from behind the firewall to the client on the public network;
wherein the VPN is extended to the client by the routing apparatus via the public network without requiring the client to install VPN software.

10. The computer-implemented method of claim 9, further comprising receiving, at the routing apparatus, another set of packets over the connection, wherein the other set of packets are encrypted by and transmitted from the client.

11. The computer-implemented method of claim 10, further comprising decrypting the other set of packets at the client using the shared secret.

12. The computer-implemented method of claim 11, further comprising using, by the routing apparatus, the shared secret to verify the other set of packets after receiving the other set of packets from the client.

13. The computer-implemented method of claim 11, wherein the transmission of the set of packets and other set of packets is associated with at least one of:
omitting a three-way handshake associated with the set of packets and other set of packets;
bypassing checksums on the set of packets and other set of packets;
setting a maximum transmission unit (MTU) associated with transmission of the set of packets and other set of packets; and
setting a receive window associated with transmission of the set of packets and other set of packets.

14. The computer-implemented method of claim 13, wherein omitting the three-way handshake comprises at least one of:
omitting the transmission of one or more packets associated with the three-way handshake; and
performing, at the routing apparatus, the three-way handshake with an endpoint associated with the three-way handshake in lieu of transmitting the one or more packets to the VPN gateway.

15. The computer-implemented method of claim 13, wherein the MTU and the receive window are associated with a previous connection of the routing apparatus with the VPN.

16. A non-transitory computer-readable storage medium storing instructions that when executed by a computer cause the computer to perform:
establishing a connection between a routing apparatus on a public network and a virtual private network (VPN) gateway behind a firewall in a private network extended by the VPN;
receiving, by the VPN gateway, a set of packets from a host device of the private network, encrypting, by the VPN gateway, the set of packets using a shared secret that is unknown to the routing apparatus and shared between a client on the public network and the VPN gateway that is behind the firewall of the private network, and inserting, by the VPN gateway, a destination identifier of the client on the public network; and
transmitting, by the VPN gateway, the set of packets having the destination identifier of the client to the routing apparatus;

wherein secure access to private resources of the host device behind the firewall of the private network is extended from behind the firewall to the client on the public network;

wherein the VPN is extended to the client by the routing apparatus via the public network without requiring the client to install VPN software.

17. The non-transitory computer-readable storage medium of claim 14, wherein the method further comprises using, by the routing apparatus, the shared secret to verify the second set of packets after receiving the second set of packets from the client.

18. The non-transitory computer-readable storage medium of claim 15, wherein the improving the transmission of the first and second sets of packets is associated with at least one of:

omitting a three-way handshake associated with the first and second sets of packets;

bypassing checksums on the first and second sets of packets;

setting a maximum transmission unit (MTU) associated with transmission of the first and second sets of packets; and setting a receive window associated with transmission of the first and second sets of packets.

19. The non-transitory computer-readable storage medium of claim 16, wherein omitting the three-way handshake comprises at least one of:

omitting the transmission of one or more packets associated with the three-way handshake; and performing, at the routing apparatus, the three-way handshake with an endpoint associated with the three-way handshake in lieu of transmitting the one or more packets to the VPN gateway.

20. The non-transitory computer-readable storage medium of claim 16, wherein the MTU and the receive window are associated with a previous connection of the routing apparatus with the VPN.

\* \* \* \* \*